(Model.)
T. J. PAIRPOINT.
Pin Holder.
No. 233,874.          Patented Nov. 2, 1880.
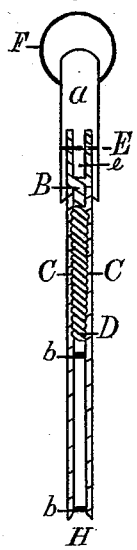
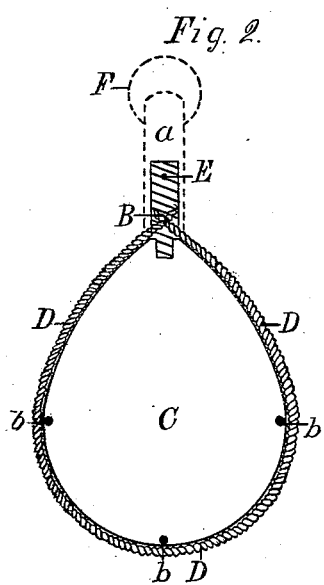
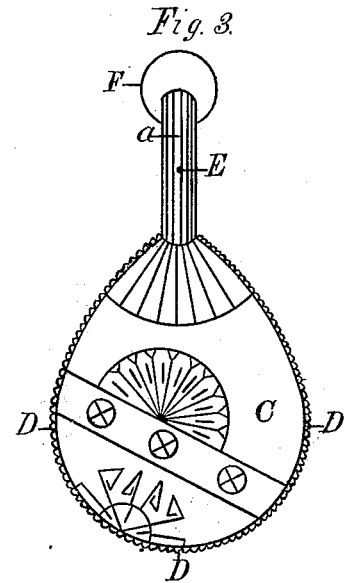
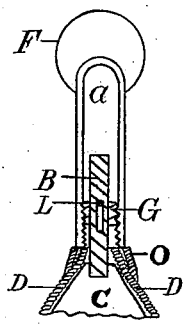
Witnesses:
Fred. S. Shirley
Chas. F. Swift
Inventor:
Thomas J. Pairpoint,
Per. J. H. Howard,
Atty.

UNITED STATES PATENT OFFICE.

THOMAS J. PAIRPOINT, OF NEW BEDFORD, MASSACHUSETTS.

PIN-HOLDER.

SPECIFICATION forming part of Letters Patent No. 233,874, dated November 2, 1880.

Application filed March 24, 1880. (Model.)

*To all whom it may concern:*

Be it known that I, THOMAS J. PAIRPOINT, designer, a citizen of Great Britain, residing at New Bedford, in the county of Bristol and State of Massachusetts, have invented certain new and useful Improvements in Pin-Holders; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention consists in the new construction of a pin-holder, arranged to be used as an ornamental appendage to a lady's chatelaine, forming an article both novel and useful, as fully shown in accompanying drawings.

Figure 1 is a vertical section of the holder. Fig. 2 is a flat view with plate removed. Fig. 3 is a plan or front view of same. Fig. 4 is a sectional view, showing a modification of the manner of tightening the cord in the channel.

Similar letters refer to similar parts throughout the several views.

The plates C C are formed of metal or other suitable material, and are preferably made in the shape and form of a Japanese fan. These plates C C have a beveled edge toward the inner side, which is provided with small projecting studs b, for keeping the plates apart from each other, so as to leave a slight space between them. When joined together between these plates the stem or straining-post B is inserted and securely fastened either by soldering or in some other suitable manner. When the plates are joined they form a groove or V-shaped channel, H, and a narrow slit aperture to center. In this channel I place a cord or other suitable material for the purpose, and to secure it in position I pass it around the post B, and by leaving the tie or knot in the post B, which is hollow, and provided with a slot to receive same, the cord can be joined by wire, and by drawing it together in the slot e it will be made taut and firm, and the method of fastening entirely concealed by the handle or closing-cover a, which is provided with an attaching-ring, F. This handle or casing is secured by a pin or rivet, E.

If found more desirable I also arrange the fastening of cord and handle-casing by a screw, which tightens both simultaneously. By having a threaded collar, G, Fig. 4, slid over the post, with a pin, L, crossing same, over which the cord D, being made into one piece, the ends being tied or wove together, is passed, after passing through the boss O, which acts as a washer for the handle-case to tighten against.

The handle-case has a thread on the interior, and is screwed onto collar G, which draws down the cord and tightens on the handle-case, and secures both at same time without rivet or any external fastenings.

Though I show this in the form of a fan, I do not limit myself to this exact form, as the same construction can be applied to circular and other forms, and a tightening-point can be made in the center or other convenient point when constructed. The article is finished by electro-plating, if of metal, or by any other finish suitable to the purpose.

Having described my invention, what I claim, and desire to secure by Letters Patent, is—

1. In a pin-holder, a cord-cushion arranged on the periphery of parallel plates, the cord being secured by the post B, substantially as shown, and for the purpose described.

2. The combination of plates C C, cord D, and hollow post B, having slot e, substantially as shown, and for the purpose described.

3. A pin-holder consisting of parallel plates C, beveled to form groove H, for reception of cord D, in combination with straining-post B and handle a, substantially as shown and described.

4. In a pin-holder, the cord D, passed around the edges of the parallel plates c c and around post B, and covered by a handle, a, to fasten and conceal its ends, substantially as shown and described.

In testimony whereof I affix my signature in presence of two witnesses.

THOMAS J. PAIRPOINT.

Witnesses:
G. T. SANFORD,
FREDK. S. SHIRLEY.